(No Model.)
H. H. SPENCER.
SEEDING ATTACHMENT FOR PLOWS.
No. 255,348. Patented Mar. 21, 1882.
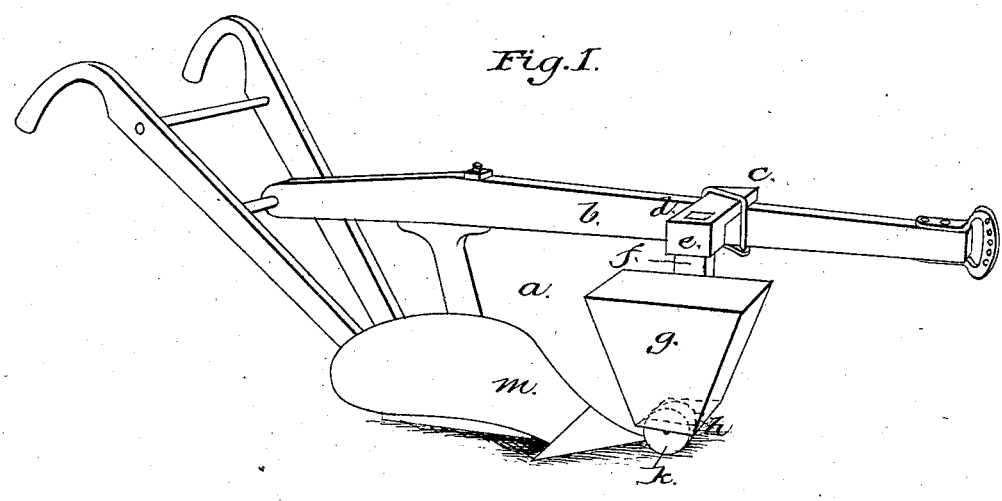
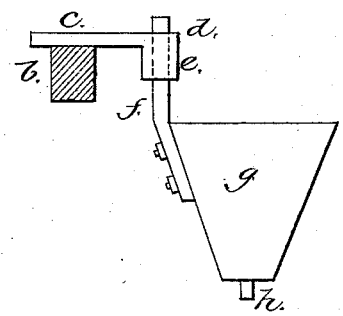
WITNESSES
John A. Ellis
Philip Ellisasi
INVENTOR
H. H. Spencer,
by Anderson Smith
his ATTORNEYS.

United States Patent Office.

HENRY H. SPENCER, OF MOUND CITY, ILLINOIS.

SEEDING ATTACHMENT FOR PLOWS.

SPECIFICATION forming part of Letters Patent No. 255,348, dated March 21, 1882.

Application filed July 30, 1881. (No model.)

*To all whom it may concern:*

Be it known that I, H. H. SPENCER, a citizen of the United States, resident at Mound City, Illinois, have invented a new and valuable Improvement in Seeding Attachments for Plows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my device attached to a plow, and Fig. 2 is a rear view of the same detached.

This invention relates to improvements in seeding attachments for plows; and it has for its object the production of a device whereby a furrow can be made, and the seed sowed and covered all at one and the same operation.

The invention consists in the construction and novel arrangement as hereinafter set forth.

In the annexed drawings, the letter $a$ represents a plow of ordinary construction to which my attachment is affixed. Secured to the beam $b$ is an arm or bracket, $c$, which extends out toward the furrow side of the beam past the share. At its end $d$ this arm $c$ has a vertical socket, $e$, in which works loosely the stem $f$ of the feed-box $g$, in the bottom of which box is the seed-opening $h$ and feed-wheel $k$. The length of the arm $c$ is such that as the share $m$ cuts one furrow the seed-box $g$ travels in the furrow already made and drops seed. As the box is in advance of the share, the seed is dropped in front of the overturned slice, which falls upon and covers the seed up.

This attachment can be secured to a sulky or other plow as well as to the one shown in the drawings.

I am aware of a device having a seed-box in front of the plowshare and adapted to move up and down, and lay no claim thereto, broadly.

What I claim is—

The combination of the following parts, to wit: a beam, $b$, having the arm $c$ extending at right angles thereto past the share, and provided at its end with the vertical socket $e$, the seed-box $g$, having the stem $f$, fitting said socket, and the feed-wheel $k$, located in the seed-opening $h$ in the bottom of the box, all constructed and arranged substantially as and for the purpose set forth.

In testimony that I claim the above I have hereunto subscribed my name in the presence of two witnesses.

HENRY H. SPENCER.

Witnesses:
L. F. CRAIN,
D. N. KENNEDY.